(12) United States Patent
Maciocci (10) Patent No.: US 7,962,444 B2
(45) Date of Patent: Jun. 14, 2011

(54) SYSTEM AND METHOD FOR PRESENTING A CONTEXTUAL ACTION FOR AN INDICATOR

(75) Inventor: Giuliano Maciocci, Cambridge (GB)

(73) Assignee: Qualcomm Incorporated, San Diego, CA (US)

( * ) Notice: Subject to any disclaimer, the term of this patent is extended or adjusted under 35 U.S.C. 154(b) by 503 days.

(21) Appl. No.: 12/123,246

(22) Filed: May 19, 2008

(65) Prior Publication Data

US 2009/0287646 A1   Nov. 19, 2009

(51) Int. Cl.
*G06F 17/00* (2006.01)
(52) U.S. Cl. ............ 707/609; 707/621; 455/456.6; 709/223; 709/224
(58) Field of Classification Search .......... 709/223–224; 455/414.1, 566, 456.6; 370/255, 328, 389; 707/609, 621
See application file for complete search history.

(56) References Cited

U.S. PATENT DOCUMENTS

| | | | |
|---|---|---|---|
| 2004/0030741 A1* | 2/2004 | Wolton et al. | 709/202 |
| 2004/0153373 A1* | 8/2004 | Song et al. | 705/26 |
| 2004/0203863 A1* | 10/2004 | Huomo | 455/456.1 |
| 2006/0052089 A1* | 3/2006 | Khurana et al. | 455/414.1 |
| 2006/0069666 A1* | 3/2006 | Burke et al. | 707/2 |
| 2006/0230356 A1* | 10/2006 | Sauve et al. | 715/777 |
| 2007/0276773 A1* | 11/2007 | Aravamudan et al. | 706/11 |
| 2009/0276700 A1* | 11/2009 | Anderson et al. | 715/700 |

FOREIGN PATENT DOCUMENTS

WO   2004071013 A   8/2004

OTHER PUBLICATIONS

"IntelliTXT" Wikipedia. http://en.wikipedia.org/wiki/IntelliTXT, Retrieved Oct. 1, 2009.
Morrissey, Brian, (Jul. 12, 2006). "Video Ads Spread to Links." Adweek.com. http://www.adweek.com/aw/iq_interactive/article_display.jsp?vnu_content_id+1002652638&imw=Y. Retrieved May 9, 2007.
Einstein, David (Jun. 12, 2006). "Computing Q&A: Satellite radio choices are pretty equal." San Francisco Chronicle. http://www.sfgate.com/cgi-bin/article.cgi?f=/c/a/2006/06/12/BUGMKJBDB21.DTL. Retrieved May 9, 2007.
International Search Report, PCT/US2009/041489. International Searching Authority—European Patent Office. Aug. 5, 2009.
Written Opinion of the International Searching Authority, PCT/US2009/04189. International Searching Authority—European Patent Office. Aug. 5, 2009.

* cited by examiner

*Primary Examiner* — Hanh B Thai
(74) *Attorney, Agent, or Firm* — Nicholas A. Cole (57) ABSTRACT

A method and apparatus are presented for the presentation and activation of contextual actions for interpreted content. In one aspect, keywords are recognized from an existing webpage, re-processed into a second webpage, and presented via a browser. The indicators are selectable and may invoke functionality resident on the wireless device within one or more native applications.

35 Claims, 7 Drawing Sheets

SYSTEM AND METHOD FOR PRESENTING A CONTEXTUAL ACTION FOR AN INDICATOR

FIELD

The present invention generally relates to wireless devices and, more particularly, to the presentation of contextual actions within a user interface using indicators.

DESCRIPTION OF THE RELATED ART

Many modern wireless devices have web browsers installed in order to allow users to browse the World Wide Web. As more users desire to use their web browsers, new technologies need to be developed to improve the user experience and generate additional revenue for service providers.

SUMMARY OF THE INVENTION

In one aspect, a method of presenting a contextual action on a wireless device is presented. The method may comprise of receiving a first content, deriving an indicator by interpreting the first content, and processing the first content into a second content. The second content may contain the indicator. The indicator may be associated with the contextual action. Further, the indicator may be presented with an altered appearance. The contextual action may be preloaded on the wireless device, or the contextual action may be updatable from a maintainer server. The association between the indicator and the contextual action may be accomplished by using a database, and the database may be updatable from a maintainer server. In addition, the second content may be presented, the indicator may be selected, and the contextual action for the selected indicator may be presented. The presentation of the contextual action may present a third content, in which the third content is different than the first content and the second content. Further, a menu containing one or more contextual actions for the selected indicator may be presented for the contextual action. The contextual action may be selected, and the contextual action may provide input to a native application on the wireless device based on the contextual action. The input to the native application may be provided via a plug-in, which may be updatable from a maintainer server.

In another aspect, a system of presenting a contextual action is presented. The system may comprise of means for receiving a first content, means for deriving an indicator by interpreting the first content, and means for processing the first content into a second content. The second content may contain the indicator. The indicator may be associated with the contextual action. Further, the indicator may be presented with an altered appearance. The contextual action may be preloaded on the wireless device, or the contextual action may be updatable from a maintainer server. The association between the indicator and the contextual action may be accomplished by using a database, and the database may be updatable from a maintainer server. In addition, the system may further comprise means for the second content to be presented, means for the indicator to be selected, and means for the contextual action for the selected indicator to be presented. The presentation of the contextual action may present a third content, in which the third content is different than the first content and the second content. Further, a menu containing one or more contextual actions for the selected indicator may be presented for the contextual action. The contextual action may be selected, and the contextual action may provide input to a native application on the wireless device based on the contextual action. The input to the native application may be provided via a plug-in, which may be updatable from a maintainer server.

In another aspect, a computer program product is presented, in which the computer-program product has a computer-readable medium. The computer-readable medium may contain one or more computer-readable instructions. The computer-readable instructions may comprise of at least one instruction for receiving a first content, at least one instruction for deriving an indicator by interpreting the first content, and at least one instruction for processing the first content into a second content. The second content may contain the indicator. The indicator may be associated with the contextual action. Further, the indicator may be presented with an altered appearance. The contextual action may be preloaded on the wireless device, or the contextual action may be updatable from a maintainer server. The association between the indicator and the contextual action may be accomplished by using a database, and the database may be updatable from a maintainer server. In addition, the computer-readable medium may further comprise at least one instruction for the second content to be presented, at least one instruction for the indicator to be selected, and at least one instruction for the contextual action for the selected indicator to be presented. The presentation of the contextual action may present a third content, in which the third content is different than the first content and the second content. Further, a menu containing one or more contextual actions for the selected indicator may be presented for the contextual action. The contextual action may be selected, and the contextual action may provide input to a native application on the wireless device based on the contextual action. The input to the native application may be provided via a plug-in, which may be updatable from a maintainer server.

In another aspect, a wireless device is presented in which the wireless device may have a transceiver operable to receive a first content, a user interface, a memory, and a processor. The processor may be operable to derive an indicator by interpreting the first content. Further, the processor may be operable to process the first content into a second content, where the second content may contain the indicator. The indicator may be associated with the contextual action. The indicator may be presented via the user interface with an altered appearance. The contextual action may preloaded on the memory, or the contextual action may be updatable from a maintainer server. The processor may also determine the association between the indicator and the contextual action using a database stored in the memory. The database may be updatable from a maintainer server. The processor may further present, via the user interface, the second content, select the indicator with the user interface, and present, via the user interface, the contextual action for the selected indicator. The contextual action for the selected indicator may present a third content, in which the third content is different than the first content and the second content. The processor may further present via the user interface a menu containing one or more contextual actions for the selected indicator. In addition, the processor may be operable to select, with the user interface, the contextual action, and provide input to a native application on the wireless device based on the contextual action. The input to the native application may be provided via a plug-in, and the plug-in may be updatable from a maintainer server.

Additional embodiments will be apparent in the foregoing description and equivalents thereof.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g. data from one component interacting with another component in a local system, distributed system, and/or across a network such as the Internet with other systems by way of the signal).

In this description, the terms "communication device," "wireless device," "wireless telephone," "wireless communications device," and "wireless handset" are used interchangeably. A wireless device could be a cellular telephone, a pager, a personal digital assistant ("PDA"), a smartphone, a navigation device, or a computer with a wireless connection.

In this description, the term "user interface" refers to any component capable of communicating information between a device and the outside world. The user interface may be capable of receiving input from the user (e.g., a keypad), or the user interface may be capable of transmitting output to the user (e.g., a speaker). Further, the user interface may be capable of both receiving input from the user and transmitting output to the user (e.g., a touchscreen). The input and output to the user could be visual, audio, haptic, olfactible, gustatic or any other method of interfacing with the user. The user interface could be implemented in hardware, software, or a combination of hardware and software. In addition, the user interface could be utilized for machine-to-machine communication, in which at least two intelligent devices exchange information with their respective user interfaces.

In this description, the term "content" could be any well-known Internet content including (but not limited to) webpages, instant messenger communications, Short Message Service ("SMS") messages, streaming video, streaming audio, Global Positioning System ("GPS") data, Voice over Internet Protocol ("VoIP") communications, web feeds, plain text, markup language, etc. Web-based content could be implemented using as or a combination of the following technologies: HyperText Markup Language ("HTML"), Extensible HyperText Markup Language ("XHTML"), Really Simple Syndication ("RSS"), Extensible Markup Language ("XML"), Wireless Markup Language ("WML"), Javascript, Ruby on Rails, PHP, Adobe Flash, Asynchronous JavaScript and XML-based ("Ajax"), Scalable Vector Graphics ("SVG"), etc. One of skill in the art may utilize additional technologies not enumerated above.

Wireless operators have used the "walled garden" model to prevent users from navigating to webpages which were undesirable from the wireless network operator's perspective. Some wireless network operators implement the "walled garden" model by only allowing the user to view webpages on the wireless network operator's servers. For instance, a wireless network operator may be interested in selling applications through its own application-selling webpage (or portal). Therefore, the wireless network operator may block all access to competitors who also sell applications through webpages. The "walled garden" model allows wireless operators to generate revenue by forcing the user to navigate to webpages which either (1) generate revenue for the wireless operator or, (2) do not adversely impact the current revenue of the wireless operator.

However, the "walled garden" model is falling into disfavor because users demand access to any webpage they desire. In other words, users want a browsing experience similar to that available on the personal computer ("PC"). Therefore, some wireless network operators have stopped using the "walled garden" model in favor of an "open Internet" model, in which the user is free to navigate to any desired webpage, much like the PC. The drawback for the wireless network operator is that the user is free to navigate to webpages that could harm the wireless network operator's revenue. For instance, the user could purchase applications on a competitor's webpage instead of using the wireless network operator's application-selling website. More importantly, the wireless network operator loses the "captive audience" created by the "walled garden" model. As such, the wireless network operator can no longer guarantee that any of its revenue-generating portals are ever seen by the users.

The QTags system allows for re-rendering of existing web-based content. Therefore, the QTags system addresses this long-felt need in the art to allow the user to browse to any webpage while still enabling revenue opportunities for the wireless network operator. Further, the QTags system has the advantage of presenting relevant advertising while the user is browsing web-content which is interesting to the user. Thus, the advertising is more effective because of its close relationship with the user's interests.

Another issue facing the wireless industry is that the browser is viewed as an endpoint of the user experience. For instance, the wireless device may receive a Short Message Service ("SMS") message with an embedded hyperlink. Then, the wireless device may present an option to access the hyperlink, which then launches the browser. Once the browser launches, the user has no means to access the applications within the wireless device ("native apps") without closing or suspending the browser. The situation becomes worse when the user attempts to transmit data available in the browser to other applications. For instance, the user may wish to store, in the wireless device's contact list, an office building's address, which may be found on the office building's website. In order to do this, the user has to perform a laborious copy-and-paste process in which the user copies the address to the clipboard, closes/suspends the browser, launches the contacts list and pastes the address into the contact list. Due to the manual effort and number of steps involved, many users find the experience of communicating data from the browser to the native apps frustrating. In fact, some users resort to jotting the information down on a piece of paper, switching applications, and then manually entering the information back into the newly active application.

QTags provides a seamless system for allowing the browser to share data with the native apps in a way that is desirable and convenient to the user.

Yet another issue facing the wireless industry is that the state of the art requires web developers to create web-content with marketing goals in advance. For instance, web developers choose the location of banner ads in advance and encode them into their webpages. In order to rearrange the location of the banner ads, the web developer would have to rewrite the webpages and update the hosting server. Further, if the web developer wanted to change the destination link for the banner ad, the webpage would also require updating on the hosting server. A web developer is not always able to predict marketing trends and forces, which could lead to ads being poorly presented. Further, the process of updating webpages is laborious and time-consuming for web developers.

QTags provides a means for existing webpages to be updated with new marketing and non-marketing content without requiring an update to the existing webpage hosted on the server. Thus, QTags could be used to make existing ("legacy") webpages more appealing and marketable to users.

Figure 1:
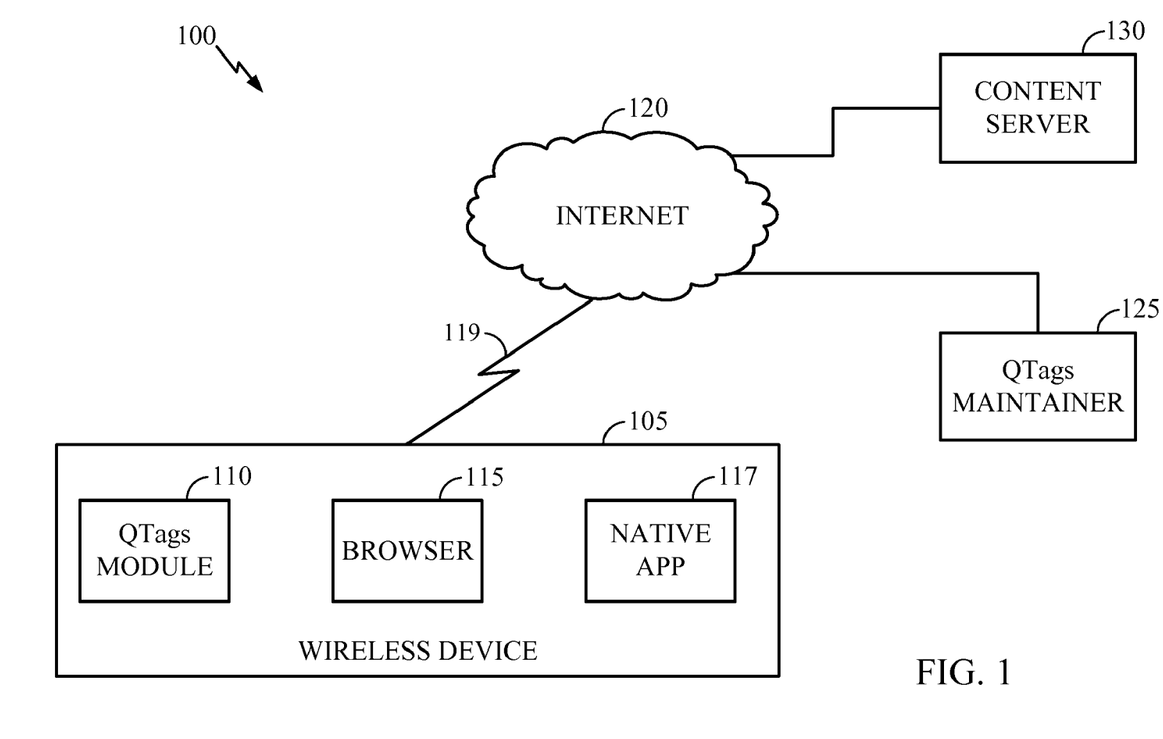
FIG. 1 is a diagram of a QTags system.

FIG. 1 depicts a high-level view of the QTags system 100. A wireless device 105 is connected to the Internet 120 through a link 119. The link 119 could be based on any known means for wireless communication between the wireless device 105 and the Internet 120. The link 119 should be capable of communicating content. In one aspect, the link 119 could be implemented using code division multiplexed access ("CDMA"), time division multiplexed access ("TDMA"), frequency division multiplexed access ("FDMA"), orthogonal frequency division multiplexed access ("OFDMA"), global system for mobile communications ("GSM"), Analog Advanced Mobile Phone System ("AMPS"), Universal Mobile Telecommunications System ("UMTS"), 802.11a/b/n ("WiFi"), World Interoperability for Microwave Access ("WiMAX"), or other wireless communication technology. The QTags system 100 does not rely on a particular wireless technology and should be compatible with any wireless communication standard available in the industry.

The link 119 might be provided by a wireless network operator or a third party. The wireless network operator owns the infrastructure and any licenses to operate the wireless communication technology. Examples of wireless network operators in the United States are Verizon, Sprint, and AT&T. However, some wireless technologies are operated by the third party which owns infrastructure and may not require a license to operate certain wireless technologies (e.g., WiFi). For instance, the link 119 could be a WiFi hotspot at a local coffee shop (e.g., Starbucks). The QTags system 100 could operate across the link 119 whether hosted by the wireless network operator or the third party.

The wireless device 105 may contain a QTags module 110, a browser 115, and at least one native app 117. The working components of the QTags module 110 are described in more detail in FIG. 4, FIG. 5, and FIG. 6 (infra). The QTags module 110 could exist within the wireless device 105 (as shown), or the QTags module could reside on a separate device or server. One of skill in the art will appreciate that having the QTags module 110 resident on the wireless device 105 may increase demand on wireless device 105 resources but might reduce latency between requests. In contrast, hosting the QTags module 110 on a separate device or server might make it easier to update the QTags module 110 and reduce demand on wireless device 105 resources. However, hosting the QTags module 110 on a separate device or server might come at the cost of increase latency between requests. One of skill the art could balance the aforementioned considerations when deploying the QTags system 100 in the market.

The browser 115 should be capable of at least browsing content on the Internet 120. In addition, the browser 115 could be capable of more advanced browsing capabilities (such as rendering content written in any of the languages enumerated supra). The browser 115 should have some integration with the QTags module 110 such that the QTags system is accessible by the user. The integration between the browser 115 and the QTags module 110 is described in detail in FIG. 2 and FIG. 3 (infra).

The native apps 117 are applications that may be resident on the wireless device 105. The native apps 117 could be pre-installed or dynamically downloaded over the link 119. A few examples of a native app 117 are address books, calendars, games, multimedia players, navigation applications, business applications, etc.

The Internet 120 is a publicly accessible network of computers that transmit data to each other using the Internet Protocol ("IP"). As previously stated supra, a wireless network operator (not shown) could host the link 119. For instance, the wireless network operator could maintain a series of base stations and mobile switching centers which would connect the wireless device 105 to the Internet 120. Alternatively, the Internet 120 could be accessed by 802.11a/b/g/n WiFi in which case the link 119 could be embodied as a WiFi-enabled router, connected to a broadband Internet connection.

A content server 130 hosts webpages and other Internet content. For example, the content server 130 could host a shopping website where the wireless device 105 could purchase and download content (e.g., ringtones, wallpapers, music, video, etc.). The content server 130 could also host any well-known website such as Google.com, Yahoo.com, Amazon.com, eBay.com, Slashdot.org, etc.

Figure 4:
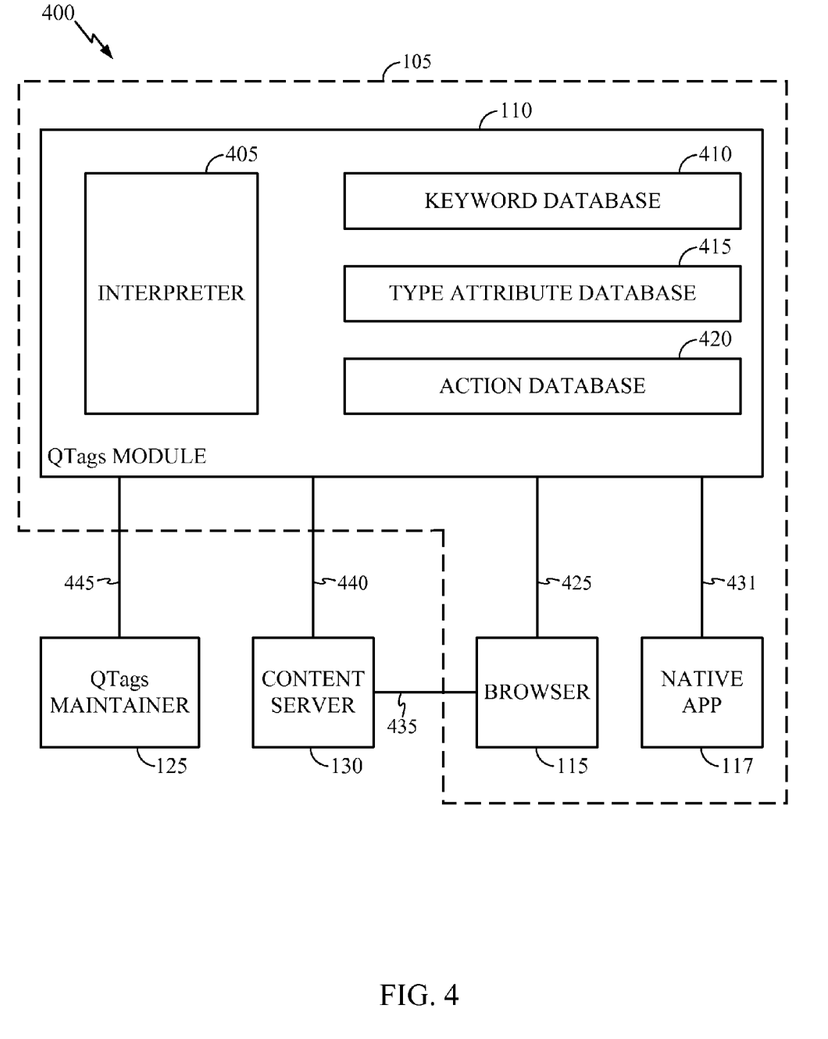
FIG. 4 is a block diagram depicting the internal components of the QTags system.
Figure 6:
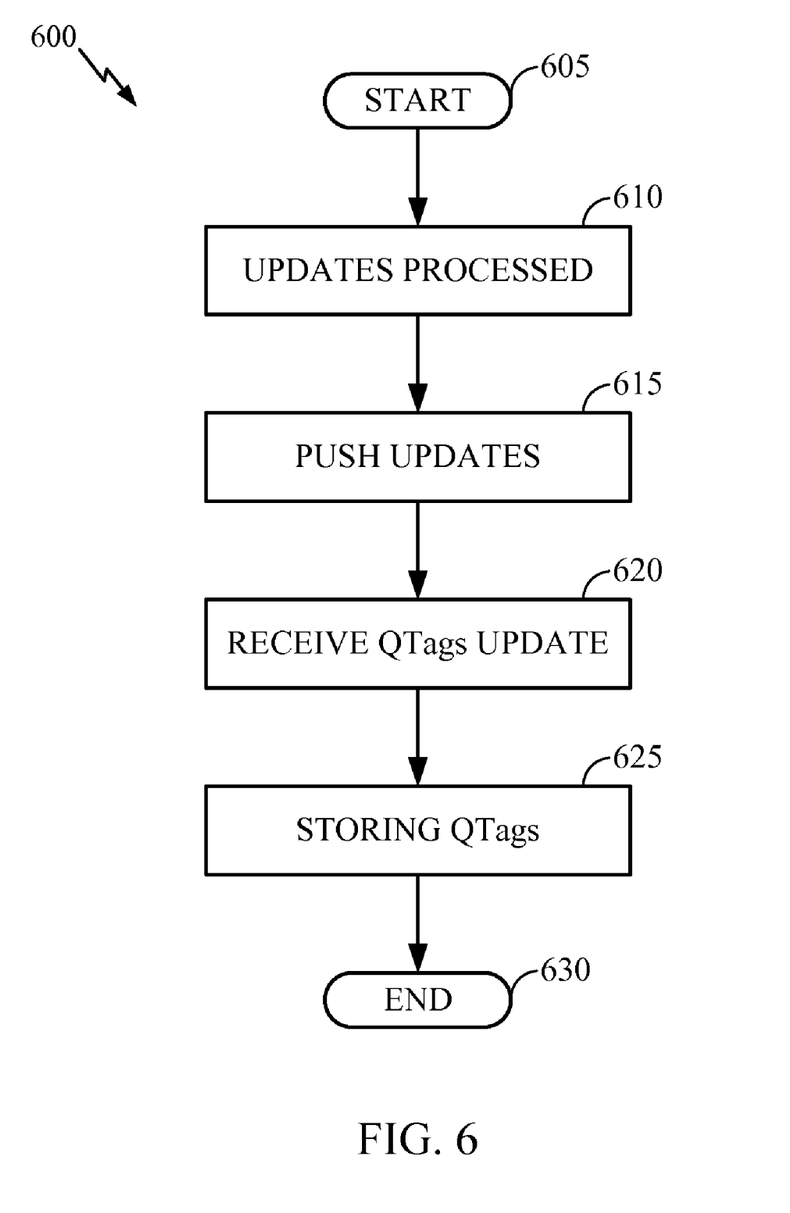
FIG. 6 is a flowchart illustrating the process of updating the QTags system.

The QTags maintainer 125 is a server which provides data to the QTags module 110. The QTags maintainer 125 could transmit updates to the QTags module 110 as well. FIG. 4 and FIG. 6 infra describe the interaction between the QTags maintainer 125 and the QTags module 110 in more detail.

Figure 2:
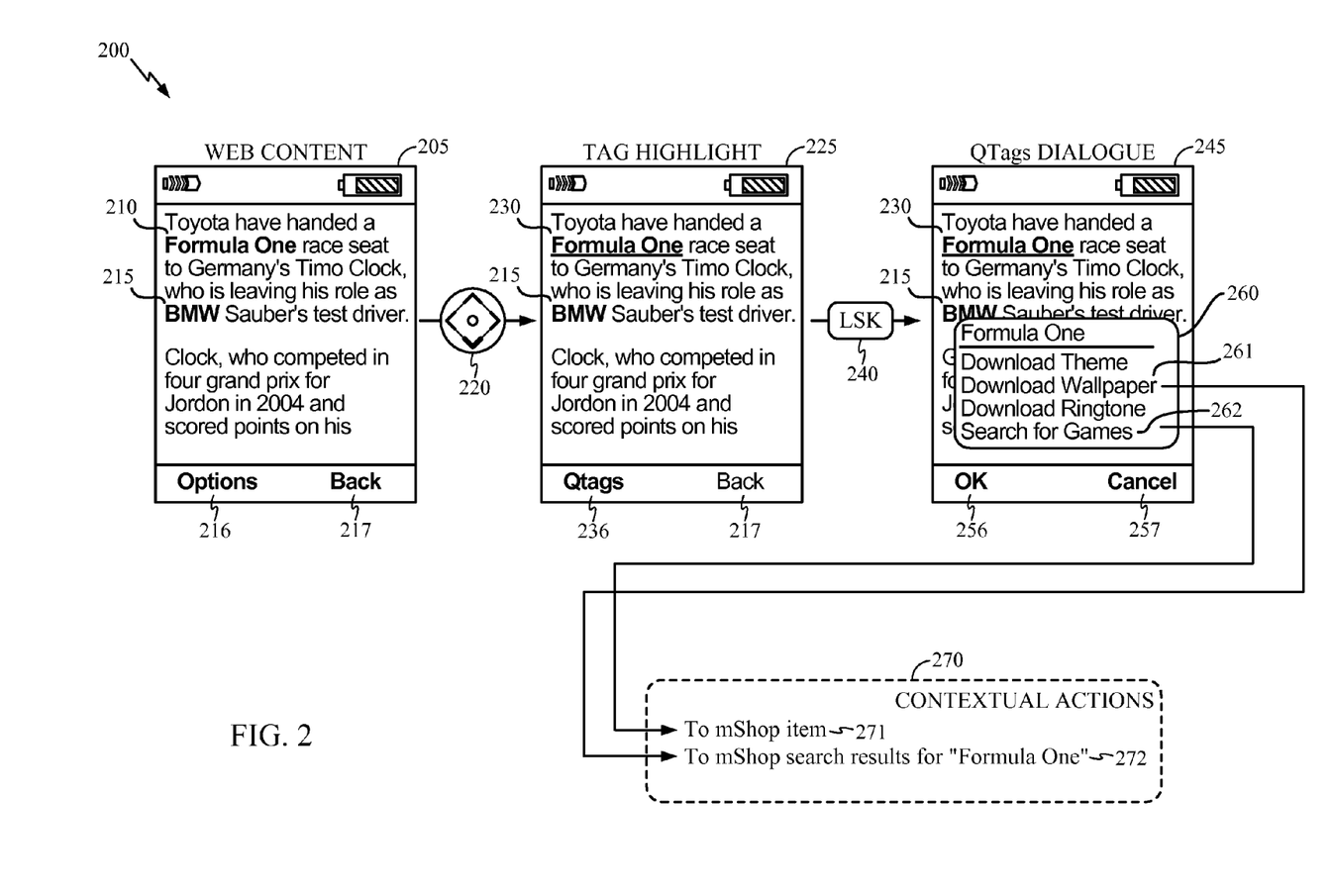
FIG. 2 is a block diagram depicting the QTags system running on a wireless device.

FIG. 2 depicts an exemplary representation 200 of the QTags system running on the wireless device 105. A "Web Content" screenshot 205, a "Tag Highlight" screenshot 225, and a "QTags Dialogue" screenshot 245 each depict the QTags user experience.

In the Web Content screenshot 205, the browser 115 is viewing a webpage related to Formula One racing. A "Formula One" indicator 210 and a "BMW" indicator 215 are provided. The rest of the text presented in the Web Content screenshot 205 is normal HTML text (e.g., "Toyota have handed a . . ."). Both indicators 210, 215 would otherwise be normal HTML text; however the indicators 210, 215 have an altered appearance as a result of the QTags module's 110 processing. The altered appearance of the indicators 210, 215 is one aspect that might require integration between the QTags module 110 and the browser 115 because the browser 115 might require additional functionality to recognize and display indicators properly.

In this description, the term "indicator" is used to describe a link created by the QTags system 100. An indicator may have an altered appearance, which could include (but is not limited to) the following styles: underlined, bolded, italicized, marquee, blinking, larger font, smaller font, or any combination thereof. An indicator could have its own style of font as well to set it apart from surrounding text. In one aspect, an indicator could be an icon or other graphical image. An indicator may have functionality where it may be accessed by the browser 115 to execute a contextual action. As will be shown in FIG. 2 and FIG. 3 (infra), the indicator may be selected to present a contextual actions menu. The contextual action may allow interaction between the indicator and the native apps 117. In one aspect, the contextual action provides output from the indicator as input to the native apps 117. In another aspect, the indicator may require additional user input before sending data to the native apps 117.

In yet another aspect, the contextual action need not be related to the native apps 117; for instance, the contextual action could simply redirect the browser 115 to a new piece of web-based content. For instance, the selection of the indicator and the subsequent presentation of the contextual action could cause the browser 115 to seamlessly present a website, download a wallpaper, begin streaming video/audio, etc. In this aspect, the presentation of the contextual action may not be readily apparent to the user because the contextual action may not require user interaction i.e. the user will simply see the new piece of web-based content. Thus, the contextual action may only need to operate in the background while the new piece of web-based content is being presented.

The contextual action could be embodied in a number of different ways. The contextual action could be as simple as a hyperlink. For instance, the QTags module 110 could recognize a string of keywords and replace them with a marketing hyperlink. Alternatively, the contextual action could be more elaborate (as shown in FIG. 2), where the contextual action present a number of actions for the user, some of which are integrated with the native apps 117.

The Web Content screenshot 205 also depicts an Options softkey 216 and a Back softkey 217. The Options softkey 216 could be used for well-known browser commands such as refresh page, go to web address, forward, back, etc. The Back softkey 217 could be used to navigate to the last webpage viewed with the browser 115.

A browser navigation command could be used to navigate within a webpage. For instance, the user could press a down key 220 on the directional pad of the wireless device 105. Upon pressing the down key 220, the screen of the wireless device 105 changes such the screen looks like the Tag Highlight screenshot 225.

The Tag Highlight screenshot 225 contains a highlighted Formula One indicator 230. The pressing of the down key 220 results in the Formula One indicator 210 becoming the highlighted Formula One indicator 230. Note that the BMW indicator 215 is unchanged since it is not currently highlighted. When the highlighted Formula One indicator 230 is active, the Options softkey 216 becomes a QTags softkey 236. The presence of the QTags softkey 236 indicates to the user that the highlighted Formula One indicator 230 contains contextual options related to the Formula One indicator 210. The user may press the physical left soft key ("LSK") 240 of the wireless device 105 to activate the QTags softkey 236. Once the LSK 240 is pressed, the screen transitions to the QTags Dialogue screenshot 245.

Note that the displaying of the QTags softkey 236 might require integration between the browser 115 and the QTags module 110 in order to present the QTags softkey 236 as an option in lieu of the standard browser options (e.g. the Options softkey 216). One of skill in the art will appreciate that the browser 115 might require additional modifications to expose the functionality of the QTags module 110 to the user.

The QTags Dialogue screenshot 245 depicts the screen after a left softkey ("LSK") 240 has been pressed. A Formula One QTags menu 260 appears as a result of the LSK 240 being pressed. The Formula One QTags menu 260 contains a number of contextual actions for the highlighted Formula One indicator 210. For instance, the wireless device 105 may download a theme, download a wallpaper, download a ringtone, all of which are based on the subject matter of Formula One. For instance, the wallpaper could be a picture of a racer or a picture of a Formula One car crossing the finish line. In one aspect, the ringtone could be sound of a Formula One car revving its engine. In addition, the Formula One menu 260 allows the wireless device 105 to search for games that are related to Formula One menu 260 (or any similar menu) might require integration with the browser 115 and the QTags module 110 such that the browser 115 may adequately present the proper information with the menu.

A number of contextual actions 270 are depicted which show what happens when a Download Wallpaper action 261 or a Search for Games action 262 are selected from the Formula One QTags menu 260. The contextual actions 270 might require software integration between the browser 115 and the QTags module 110 such that the proper plug-in or API is invoked to launch the appropriate native app 117. If the Download Wallpaper action 261 is selected, the wireless device 105 may launch mShOP™, which is a native app 117 used to purchase wallpapers, themes, ringtones, music, video, games, and other content or applications. Once mShop is launched, the QTags module 110 passes contextual action 270 input to mShop such that mShop automatically presents the user with the option to buy a Formula One wallpaper. A "To mShop item" contextual action 271 depicts the relationship between the Download Wallpaper action 261 and the native app 117, mShop.

Alternatively, the Search for Games action 262 could be selected which would activate a "To mShop search results for 'Formula One'" contextual action 272, which causes mShop to search for Formula One games automatically and display the results on the wireless device 105. Again, the contextual action 270 is providing input to mShop based on the indicator such that mShop is able to immediately search for games related to Formula One. Once mShop launches, the user could purchase and download any Formula One game listed in the search results via mShop. In one aspect, the user would not need to perform any searches to have all the Formula One games listed because the contextual actions 270 and the QTags module 110 provides the proper input to mShop behind the scenes.

Figure 3:
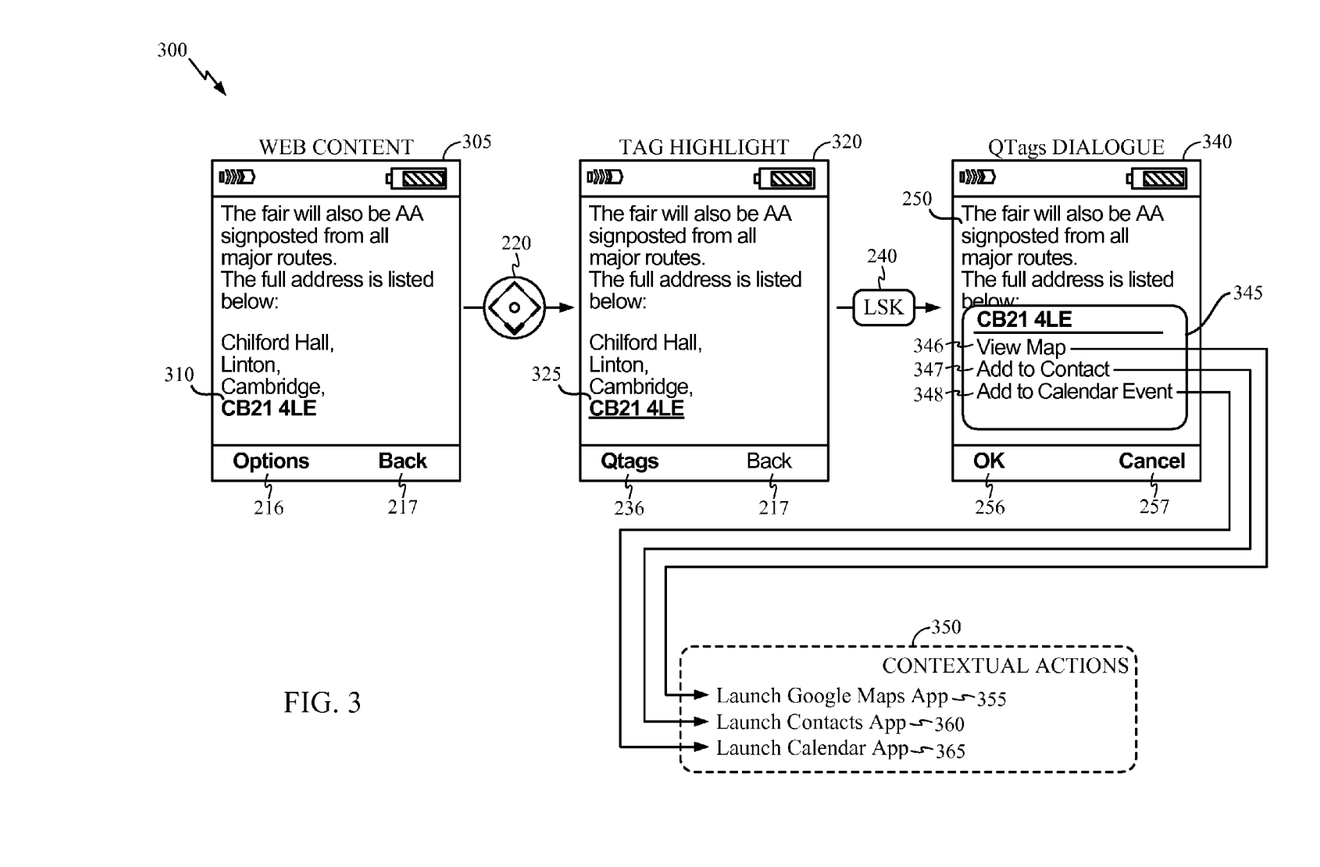
FIG. 3 is a yet another block diagram depicting the QTags system running on the wireless device.

FIG. 3 depicts yet another exemplary representation 300 of the QTags system running on the wireless device 105. A "Web Content" screenshot 305, a "Tag Highlight" screenshot 320, and a "QTags Dialogue" screenshot 340 each depict the QTags user experience.

In the Web Content screenshot 305, the browser 115 is viewing a webpage related to the address of a fair located at Chilford Hall. A physical address "CB21 4LE" indicator 310 is provided. The rest of the text presented in the Web Content screenshot 305 is normal HTML text (e.g., "The fair will also be AA . . ."). The "CB21 4LE" indicator 310 would otherwise be normal HTML text; however the "CB21 4LE" indicator 305 has an altered appearance as a result of the QTags module's 110 processing.

The Web Content screenshot 305 also depicts the Options softkey 216 and the Back softkey 217. Note that the softkeys displayed are the same as the softkeys shown in FIG. 2 supra. As such, the Options softkey 216 could be used for well-known browser commands such as refresh page, go to web address, forward, back, etc. Likewise, the Back softkey 217 could be used to navigate to the last webpage viewed with the browser 115.

Just as in FIG. 2 supra, a browser navigation command could be received by the wireless device 105. For instance, the user could press a down key 220 on the directional pad of the wireless device 105. Upon pressing the down key 220, the screen of the wireless device 105 changes such the screen looks like the Tag Highlight screenshot 320.

The Tag Highlight screenshot 320 contains a highlighted "CB21 4LE" indicator 325. The pressing of the down key 220 results in the "CB21 4LE" indicator 310 becoming the highlighted "CB21 4LE" indicator 325. When the highlighted "CB21 4LE" indicator 325 is active, the Options softkey 216 becomes the QTags softkey 236. The presence of the QTags softkey 236 indicates to the user that the highlighted "CB21 4LE" indicator 325 contains contextual actions related to the "CB21 4LE" indicator 310. The user may press the physical left soft key ("LSK") 240 of the wireless device 105 to activate the QTags softkey 236. Once the LSK 240 is pressed, the screen transitions to the QTags Dialogue 340 screenshot.

The QTags Dialogue 340 screenshot depicts the screen after the LSK 240 has been pressed by the user. A "CB21 4LE" QTags menu 345 appears as a result of the LSK 240 being pressed. Note that there are different options shown than in the Formula One menu 260 from FIG. 2 supra because the QTags system 100 has derived a new set of contextual actions based on the highlighted "CB21 4LE" indicator 325. The process of deriving contextual actions is discussed in more detail in FIG. 4 and FIG. 5 infra. The "CB21 4LE" QTags menu 345 contains a number of contextual actions for the highlighted "CB21 4LE" indicator 325: a View Map action 346, an Add to Contact action 347, and a Add to Calendar Event action 348.

A number of contextual actions 350 are depicted which show what happens when the View Map action 346, the Add to Contact action 347, or the Add to Calendar Event action 348 are selected. The QTags module 110 uses the contextual actions 350 presented in the "CB21 4LE" QTags menu 345 with at least one of the native apps 117. For example, if the View Map action 346 is selected by operating the OK softkey, then a Launch Google Maps App contextual action 355 is invoked. Google Maps is a well-known mapping application that allows users to view and navigate to real-world locations using either the browser 115 or an application. Google Maps is publicly available at http://maps.google.com. The Launch Google Maps App contextual action 355 depicts that the QTags module 110 will use the physical address "CB21 4LE" as input to Google Maps in order to seamlessly display a map of the fair's location. The QTags module 110 has saved the user the hassle of having to write down the address, separately launch the Google Maps App from the native apps 117, and manually input the physical address in order to find the location of the fair.

The next example of the contextual actions 350 being invoked occurs when the user selects the Add to Contact action 347 and operates an OK softkey 256. The Add to Contact action's 347 corresponding contextual action is a Launch Contacts App contextual action 360. The contacts app is one of the native apps 117 which stores contacts in the wireless device 105. For instance, the wireless device 105 could store contact entries which includes, but is not limited to, the name, the title, the company, the address, and the phone number of a contact as shown in Table 1 (infra):

TABLE 1

Example Contact Entry

| Name | Tyler Durdan |
|---|---|
| Title | CEO |
| Company | Paper Street Soap Company |
| Address | 420 Paper St. Wilmington, DE 19886 |
| Phone Number | (288) 555-0153 |

Note that the contact fields presented in Table 1 are merely exemplary and any conceivable type of information could be associated with a contact. By selecting the Add to Contact action 347, the QTags module 110 uses the physical address ("Chilford Hall, Linton, Cambridge CB21 4LE") as the entry for a contact (i.e. as input for the contact app). Using the example from Table 1, the QTags module could substitute the Address field with the physical address. Alternatively, the physical address could be used to generate a new contact. One of skill in the art could devise a number of ways to utilize the physical address within the contacts app given the fact that the QTags module 110 is able to take the physical address from the browser 115 and provide the physical address as input to the contacts app via the contextual actions 350.

If the Calendar Event action 348 is selected, the QTags module uses the physical address as input to the calendar app. The calendar app is another one of the possible native apps 117 and is capable of storing dates and additional data. For instance, the calendar app could store the location of the fair and the date on which the fair occurs, e.g., Feb. 29, 2008 at 3:00 p.m. When the Calendar Event action 348 is selected, the Launch Calendar App contextual action 365 is invoked which indicates that the QTags module 110 could use the physical address as input to the calendar app. For example, the calendar app could create a new event and associate the address with the new event automatically. Alternatively, the physical address could be associated with an existing event. One of skill in the art could devise many different ways to utilize the physical address input from the QTags module 110 within the calendar app.

FIG. 2 and FIG. 3 both demonstrate the user experience on the wireless device 105. However, FIG. 2 and FIG. 3 are not the only embodiments of the QTags system 100. One of skill in the art could devise different indicators, QTags menu options, as well as contextual actions. Further, the invocation of the QTags system 100 need not be performed using softkeys, but rather could be performed using a touchscreen, voice commands, keypad, gestures, etc.

In one aspect, the number of indicators presented is somewhat limited, as shown in FIG. 2 and FIG. 3 supra. With a limited number of QTags, the viability of the solution may increase because the user will not become so inundated with visuals cues such that indicators are ignored altogether. One of skill in the art could easily find the right balance of indicators per page, thus allowing for the optimal amount of QTags interaction.

In another aspect, the balance between marketing-based indicators (such as the Formula One indicator 210) and non-marketing-based indicators (such as the "CB21 4LE" indicator 310) could be achieved. If too many marketing-based indicators are show, the user may be dissuading from activating QTags because the user might feel as though the QTags system 100 is yet another unwanted advertising ploy. On the other hand, if there are too many non-marketing-based indicators, then the operator or third-party provider of the QTags system 100 will not have as much incentive to operate the QTags system because non-marketing-based indicators may not generate revenue. One of skill in the art could find the balance between the types of indicators such that the QTags system 100 creates both revenue and an enhanced user experience.

FIG. 4 is a block diagram 400 depicting the internal components of the QTags system 100. FIG. 4 describes the individual components of the QTags system 100 while FIG. 5 and FIG. 6 infra describe how the components interact in order to generate the screenshots from FIG. 2 and FIG. 3 supra.

The QTags module 110 may contain an interpreter 405, a keyword database 410, a type attribute database 415, and an action database 420. The interpreter 405 is used to process content, which is received through a link 440 to the content server 130. The processing of content by the interpreter 405 is how the indicators (described in FIG. 2 and FIG. 3 supra) are generated by the QTags module 110. The interpreter 405 is capable of generating the physical appearance of the indicators (e.g. bold, underlined, etc.) in a "re-processed" webpage that allows the browser 115 to invoke QTags-based contextual actions (e.g., add to my contacts). The re-processed webpage is then passed to the browser 115 over a link 425. The generation of the re-processed webpage may be supported by the keyword database 410, the type attribute database 415, and the action database 420.

In one aspect the interpreter 405 could utilize pattern recognition in order to create the re-processed webpage. In another aspect the interpreter 405 could utilize artificial intelligence ("AI") techniques such as neural nets, genetic algorithms, decision trees, Bayesian networks, rule-based AI, etc. One of skill in the art could devise a number of varying, yet effective methods for creating the re-processed webpage.

The keyword database 410 is utilized by the interpreter 405 to generate the indicators. Using FIG. 2 supra as an example, a keyword within the keyword database 410 could be "Formula One." Thus, when the interpreter 405 processes content from the content server 130, the interpreter 405 may recognize keywords from the keyword database 410 in order to render the webpage with QTags. In FIG. 2, the keyword "Formula One" is recognized and transformed into an indicator in the re-processed webpage.

The type attribute database 415 contains the various types that may exist with the QTags system 100. In addition, the type attribute database 415 provides an abstraction layer between the action database 420 and the keyword database 410. For instance, a type could be as simple as "ringtone." The type "ringtone" could be associated with the contextual action "Download Ringtone" or "Play Ringtone," both of which would be contained in the action database 420. Thus, the "ringtone" type could associated with one or more actions. The keywords in the keyword database 410 could be associated with one or more types within the type database 415. For instance, the keyword, "Formula One," could be associated with the "ringtone" type and a new "wallpaper" type. Thus, when the Formula One indicator 210 from FIG. 2 is selected, any contextual actions associated with both the type "ringtone" and "wallpaper" would populate the Formula One QTags menu 260.

The action database 420 allows the QTags system to interact with the native apps 117. A link 431 is utilized to send and receive data between the components of the QTags module 110 and the native apps 117. The action database 420 contains the contextual actions. The action database 420 may have a relationship between the type database 415 in order to associate the proper action with type and keyword.

In one aspect, the action database 420 contains a set of updatable plug-ins which are compatible with the native apps 117. Going back to the example from FIG. 3, the action database 420 could contain a plug-in to interact with the Google Maps App such that addresses could be passed as input the Google Maps App. Such interaction may require the invocation of application programmer interfaces ("APIs") in order for the QTags module 110 to manipulate the functionality of the native apps 117. The action database 420 could be preloaded with all the functionality required to interact with the native apps 117, or the action database 420 could be extensible and updatable. Therefore, if a new application is added to the native apps 117, then the action database 420 may be updated in order to interact with the new application. Likewise, if an application is deleted from the native apps 117, then the action database 420 could remove anything related to the deleted application, thus saving memory on the wireless device 105. Updates to the action database 420 may be received from a link 445 to the QTags Maintainer 125.

The QTags Maintainer 125 may be capable of generating updates to any of the components of the QTags module 110 as well as provide updates to the entire QTags module 110 itself. In one aspect, the QTags maintainer 125 could provide new algorithms for the interpreter 405. For instance, if a developer discovers a new, more efficient method of searching for indicator keywords, then the new algorithm could be transmitted to the interpreter 405 by the QTags maintainer 125. In another aspect, if new indicator keywords are desired, then the QTags maintainer 125 could transmit those new keywords to the keyword database 410. Going back to the example in FIG. 2, once the Formula One season ends, the keyword database 410 could be updated with new keywords in anticipation of the next downhill skiing season. Further, the keywords related to the Formula One season could optionally be removed from the keyword database 410. In one aspect, the keywords, types, or contextual actions may be expired by the QTags maintainer 125 after a specific date, time, or event. The type attribute database 415 could be updated with new types as well as the associations among types and actions. Further, the association between types and keywords could be updated. The action database 420 could also be updated using the QTags maintainer 125. As previously stated, the action database 420 may require new functionality in order to interact with the native apps 117. Such new functionality could be transmitted to the action database 420 in the form of an update by the QTags maintainer 125.

The content server 130 provides content to the QTags module 110 over the link 440 as well as the browser 115 over a link 435. As previously stated, the content server 130 provides content over the link 440 to the interpreter 405 in order for the interpreter 405 to re-process the content with indicators and associated actions (vide supra at FIG. 2 and FIG. 3). The content provided over the link 435 is done so without processing by the QTags module 110. In one aspect, the QTags module 110 may be disabled in order to allow the user to use the browser 115 without having indicators appear.

The browser 115 may receive re-processed content from the QTags module 110 over the link 425. Also, as previously stated, the browser 115 may receive content directly from the content server 130 over the link 435; this content is not processed by the QTags module 110. The browser 115 may also transmit user interaction back to the QTags module 110 over the link 425. Referring back to FIG. 3, if the user selects the QTags softkey 236, then the browser 115 could pass that input back to the QTags module 110 such that the QTags module could generate the associated contextual actions for the highlighted Formula One indicator 230, thus creating the Formula One QTags menu 260. Further, the browser 115 could transmit the user's section within the Formula One QTags menu 260, e.g., if the user selected the Download Wallpaper action 261.

The native apps 117 may communicate with the QTags module 110 over a link 431. Using the action database 420, the QTags module 110 may need to interact with the native apps 117 over the link 431. Referring back to FIG. 2, the action database 420 may interact with the calendar app in order to associate the "CB21 4LE" address with a particular event. As such, the action database 420 may invoke an API or a plug-in in order to accomplish such interaction with any one of the native apps 117.

Note that QTags module 110, the browser 115, and the native apps 117 are depicted as being resident on the wireless device 105, as denoted with the dotted line 105 in FIG. 4. However, in another aspect, the QTags module 110 (or components therein) could be resident on a third-party server, the QTags Maintainer, or the content server 130. For instance, the QTags module 110, if resident outside the wireless device 105, could first derive contextual actions before sending the re-rendered web-based content to the wireless device 105. One of skill in the art may deploy the various components of the QTags module 110 in varying configurations without departing from the spirit and scope of FIG. 4. Further, the functionality of the QTags module 110 or its components could be split across one or more electronic devices. For instance, both a server and the wireless device 105 could work cooperatively in order to generate the contextual actions, the re-rendered web-based content, etc. One skilled in the art will appreciate that such implementation details will not depart from the scope and spirit of this description.

Figure 5:
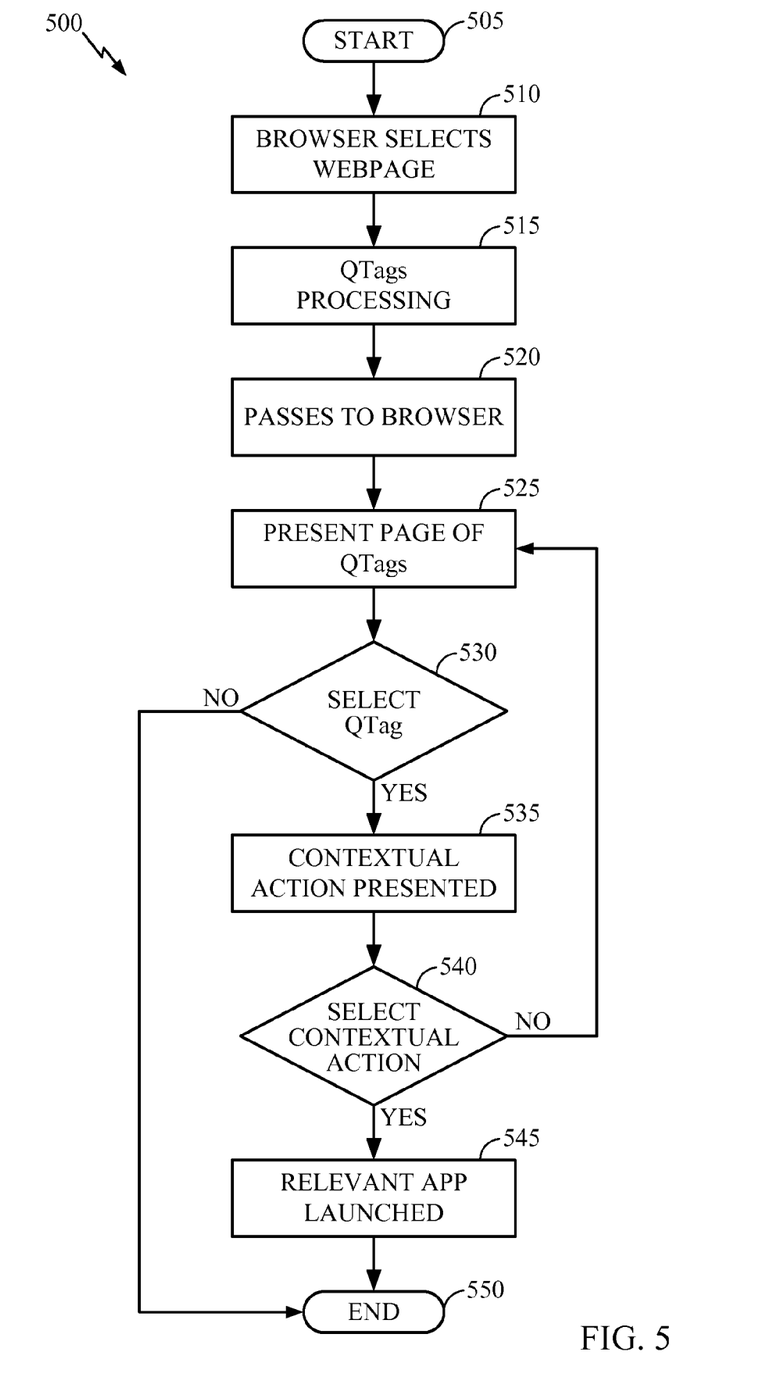
FIG. 5 is a flowchart illustrating the process of presenting contextual actions using the QTags system.

FIG. 5 is a flowchart illustrating a process 500 of presenting contextual options using the QTags system. Beginning at start block 505, the process 500 proceeds to block 510 where the browser 115 accesses a webpage. For instance, the browser 115 could navigate to a sports website similar to the Formula One "Web Content" screenshot 205 from FIG. 2. However, the sports website would not yet contain any indicators because the QTags module 110 has not re-processed the sports webpage. With reference to FIG. 4, the browser 115 would be requesting content from the content server 130 over the link 435. Note that link 435 does not pass through the QTags module 110.

The process 500 proceeds to block 515 where the QTags module 110 processes content. With reference to FIG. 4, the content server 130 transmits content to the QTags module 110 over link 440 in response to the browser's 115 request for content in block 510. The interpreter 405 receives the content from the content server 130 over the link 440 at which point the interpreter 405 utilizes the keyword database 410 to generate the indicators (e.g., the Formula One indicator 210, supra).

Proceeding to block 520, the QTags module 110 passes the re-processed content to the browser 115. The QTags module 110 communicates the re-processed content over the link 425 from FIG. 4.

Proceeding to block 525, the browser 115 presents the re-processed content to the user. Note that this is the first time the browser 115 displays the content because the previous blocks 510, 515, 520 have occurred behind the scenes without the user's knowledge. The presentation by the browser 115 could look similar to the Web Content screenshot 205 from FIG. 2 or the Web Content screenshot 305 from FIG. 3. Note that the indicators would be enabled at this block 525.

Proceeding to block 530, the browser 115 may display the re-processed content until a QTag indicator is selected. The selection process could be similar to the ones described in FIG. 2 and FIG. 3 supra. For example, the user could press the down key 220 to highlight the Formula One indicator 210. The Formula One indicator 210 would become the highlighted Formula One indicator 230, after which the left softkey 240 could be pressed in order to activate the highlighted Formula One indicator 230. If the indicator is not selected for whatever reason (e.g., the back softkey 217 is pressed), then the process 500 proceeds down the NO branch to the end block 550 at which point the process 500 terminates. Going back to block 530, if the indicator is selected, then the process proceeds down the YES branch to block 535.

Proceeding to block 535, the contextual action is presented within the browser 115. Referring back to FIG. 2 and FIG. 3, an example of the contextual action being presented is the Formula One QTags menu 260 or the "CB21 4LE" QTags menu 345. The menu presented should allow the browser 115 to select from a selection of contextual actions presented by the QTags module 110 for the selected indicator. Referring back to FIG. 4, the action database 420 and the interpreter 405 generate the selection of contextual actions based on the type attribute within the type attribute database 415. For example, the address type in FIG. 3 would be associated with contextual actions view map, add to contact, and add to calendar event. With reference to FIG. 4, the QTags module 110 communicates the selection of contextual actions over the link 425 to the browser 115.

Proceeding to block 540, one of the contextual actions may be selected. If no contextual action is selected, then the process 500 proceeds along the NO branch to block 525; for instance, a cancel softkey 257 is selected from FIG. 2. Going back to block 540, if one of the contextual actions is selected, then the process 500 proceeds along the YES branch to block 545.

Proceeding to block 545, the QTags module 110 launches application relevant to the selected contextual action. With reference to FIG. 2, the QTags module 110 could invoke the mShop app based on the selection of the Download Wallpaper action 262. In order to invoke the contextual action, the action database 420 could utilize plug-ins or APIs to interact with mShop over the link 431. Next, the action database 420 could communicate the necessary data to the native app 117. For instance, the action database 420 could pass the term "Formula One wallpaper" to mShop in order for mShop to present the Formula One wallpapers for purchase/download. Block 545 is where the contextual actions 270, 350 from FIG. 2 and FIG. 3 are invoked, respectively. While the example of Formula One wallpapers in mShop is given, one of skill in the art could devise many other contextual actions to be taken in response to an indicator being selected. Once the relevant app is launched i.e. the action database 420 has invoked at least one of the native apps 117, the process 500 proceeds to end block 550, at which point process 500 terminates.

FIG. 6 is a flowchart illustrating a process 600 of updating the QTags system 100. As described in FIG. 4 supra, the QTags maintainer 125 may be used to update the QTags module 110 or any of its components (e.g., the interpreter 405, the keyword database 410, the type attribute database 415 or the action database 420). Process 600 describes in detail how the QTags maintainer 125 updates the QTags module 110 and its components.

Process 600 begins at start block 605. Proceeding to block 610, the QTags maintainer 125 processes updates. The processing of updates could be based on user interaction, the occurrence of an event, or the non-occurrence of an event. For instance, the QTags maintainer 125 could begin processing updates in order to launch a new marketing campaign. With reference to FIG. 2 supra, assume that the Formula One season is about to end, and the wireless network operator would like to begin marketing wallpapers and ringtones based on the upcoming bobsled season. Thus, the QTags maintainer 125 could accumulate all keywords related to bobsledding. An example of some marketing keywords related to marketing bobsled wallpapers could be "bobsled," "winter sport," "race," "olympic," "helmet," "Jamaica," "time trial," etc. These keywords could be manually entered into the QTags maintainer 125 or transmitted to the QTags maintainer 125 by another server (not shown).

In one aspect, the installation of a new native app would trigger an update from the QTags maintainer 125 because the action database 420 would need new plug-ins (or APIs) in order to interact with the newly installed native app. Alternatively, the removal of a native app could trigger a QTags update because the action database 420 would no long need the plug-ins (or APIs) for the removed native app.

In another aspect, the update could be based on the occurrence of an event. For instance, if a marketing campaign is directed toward the World Cup soccer match, then the updates could be processed as teams are eliminated from the tournament. For instance, once Italy beats Germany, an update could then be processed such that all keywords, type attributes, and contextual actions related to the German World Cup team could be marked for removal. Likewise, the non-occurrence of an event could be similarly used to trigger the processing of QTags updates.

Proceeding to block 615, any updates processed in block 610 are pushed by the QTags maintainer 125 to the QTags module 110. In another aspect, the updates are pulled by the QTags module 110 from the QTags maintainer 125. The communication of updates from the QTags maintainer 125 could be based on a schedule, event, or user interaction (either on the QTags maintainer 125 or the wireless device 105). In one aspect, updates could be transmitted to the QTags module 110 when the wireless device 105 is inactive (e.g., at non-peak hours during the middle of the night).

Proceeding to block 620, the QTags module 110 receives the updates from the QTags maintainer 125. In one aspect, the QTags module 110 could perform a verification of the received update in order to check for corruption or tampering by a malicious third party. If the update is corrupt, then the QTags module 110 could request a retransmission of the update.

Proceeding to block 625, the QTags module 110 stores the QTags update. Depending on the type of update, the QTags module 110 may execute different update methods. For instance, if the keyword database 410 is being updated, then the QTags module 110 might receive a list of new keywords, a list of keywords to remove, or a combination thereof. Using the list of new (or removed) keywords, the QTags module 110 could update the keyword database 410 such that the keyword database 410 reflects the changes in the update. Likewise, if the update is destined for the type attribute database 415, then the QTags module 110 could update the type attribute database in a similar manner (e.g. adding new types, removing undesired types, or a combination thereof). The action database 420 could be similarly updated by adding or removing new plug-ins. For instance, the action database 420 might need to interact with a newly installed native app; as such, a new plug-in or API might be required for interaction. The interpreter 405 could be updated with new algorithms or improvements as well. For instance, the interpreter 405 could receive new weights for a pattern recognition neural net, which could be utilized by the interpreter 405.

In one aspect, the entire QTags module 110 might be removed and replaced with an updated version of the QTags module 110. This aspect might be used when the updates are so extensive that it would consume too much processing power on the wireless device 105 to update the components; therefore, the more efficient course of action is to replace the entire QTags module 110. Process 600 then proceeds to end block 630 at which point it terminates.

Figure 7:
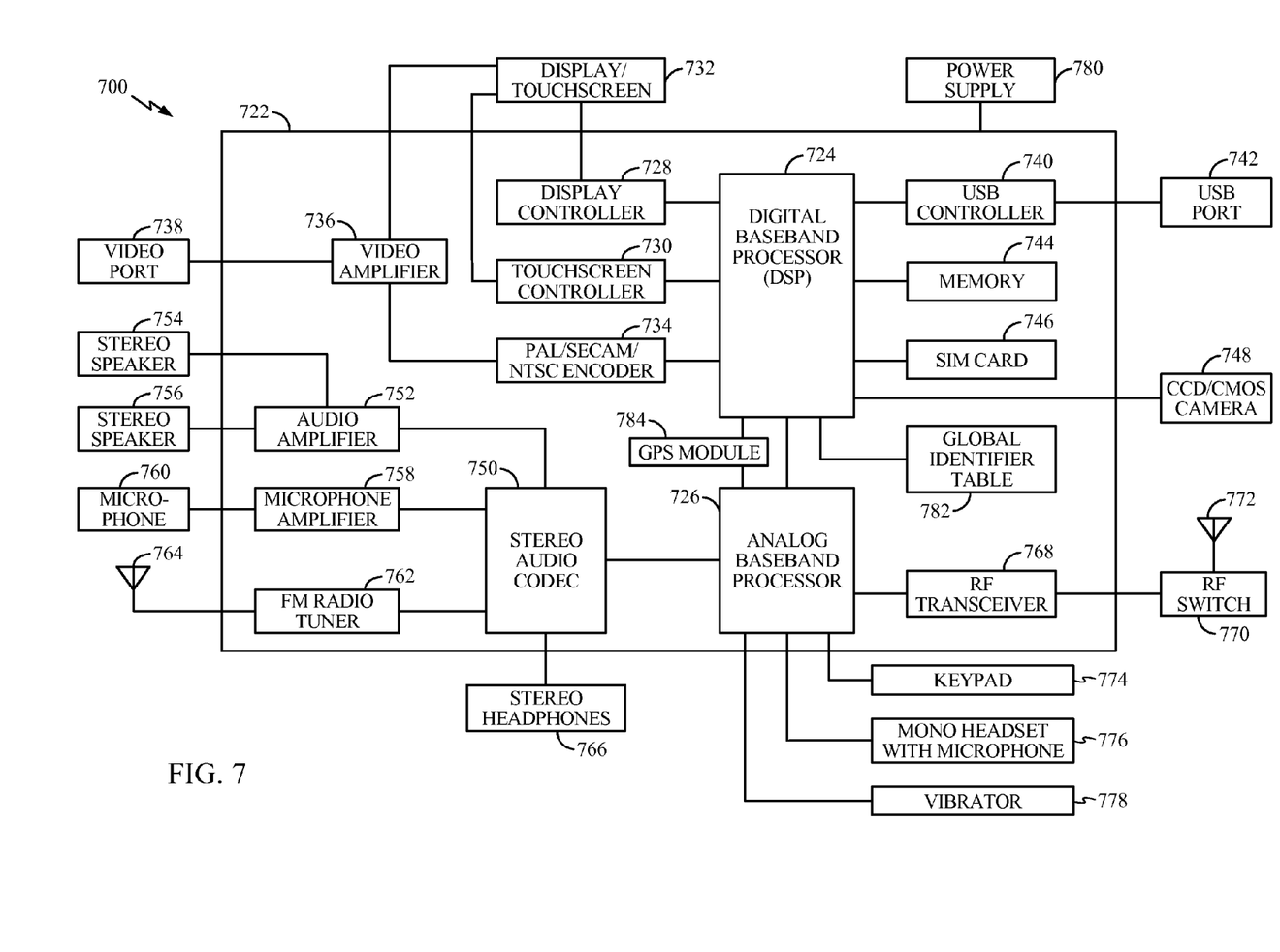
FIG. 7 is a block diagram of an exemplary wireless device.

Referring to FIG. 7, an exemplary, non-limiting aspect of the wireless device 105 is shown. As shown, the wireless device 105 includes an on-chip system 722 that includes a digital baseband processor 724 and an analog baseband processor 726 that are coupled together. As illustrated in FIG. 7, a display controller 728 and a touchscreen controller 730 are coupled to the digital baseband processor 724. In turn, a touchscreen display 732 external to the on-chip system 722 is coupled to the display controller 728 and the touchscreen controller 730.

FIG. 7 further depicts a video encoder 734, e.g., a phase alternating line ("PAL") encoder, a sequential couleur a memoire ("SECAM") encoder, or a national television system(s) committee ("NTSC") encoder, may be coupled to the digital baseband processor 324. Further, a video amplifier 736 is coupled to the video encoder 734 and the touchscreen display 732. Also, a video port 738 is coupled to the video amplifier 736. As depicted in FIG. 7, a universal serial bus ("USB") controller 740 is coupled to the digital baseband processor 724. Also, a USB port 742 is coupled to the USB controller 740. A memory 744 and a subscriber identity module ("SIM") card 746 may also be coupled to the digital baseband processor 724. Further, as shown in FIG. 7, a digital camera 748 may be coupled to the digital baseband processor 724. In an exemplary aspect, the digital camera 748 is a charge-coupled device ("CCD") camera or a complementary metal-oxide semiconductor ("CMOS") camera.

As further illustrated in FIG. 7, a stereo audio CODEC 750 may be coupled to the analog baseband processor 726. Moreover, an audio amplifier 752 may coupled to the stereo audio CODEC 750. In an exemplary aspect, a first stereo speaker 754 and a second stereo speaker 756 are coupled to the audio amplifier 752. FIG. 7 shows that a microphone amplifier 758 may be also coupled to the stereo audio CODEC 750. Additionally, a microphone 760 may be coupled to the microphone amplifier 758. In a particular aspect, a frequency modulation ("FM") radio tuner 762 may be coupled to the stereo audio CODEC 750. Also, an FM antenna 764 is coupled to the FM radio tuner 762. Further, stereo headphones 766 may be coupled to the stereo audio CODEC 750.

FIG. 7 further indicates that a radio frequency ("RF") transceiver 768 may be coupled to the analog baseband processor 726. An RF switch 770 may be coupled to the RF transceiver 768 and an RF antenna 772. As shown in FIG. 7, a keypad 774 may be coupled to the analog baseband processor 726. Also, a mono headset with a microphone 776 may be coupled to the analog baseband processor 726. Further, a vibrator device 778 may be coupled to the analog baseband processor 726. FIG. 7 also shows that a power supply 780 may be coupled to the on-chip system 722. In a particular aspect, the power supply 780 is a direct current ("DC") power supply that provides power to the various components of the wireless device 105 that require power. Further, in a particular aspect, the power supply is a rechargeable DC battery or a DC power supply that is derived from an alternating current ("AC") to DC transformer that is connected to an AC power source.

In a particular aspect, the wireless device 105 may include a global positioning system ("GPS") module 784 coupled to the DSP 724 or the analog baseband processor 726. The GPS module 784 and at least one of the processors 724, 726 may provide a means for locating the wireless device 105.

As depicted in FIG. 7, the touchscreen display 732, the video port 738, the USB port 742, the camera 748, the first stereo speaker 754, the second stereo speaker 756, the microphone 760, the FM antenna 764, the stereo headphones 766, the RF switch 770, the RF antenna 772, the keypad 774, the mono headset 776, the vibrator 778, and the power supply 780 are external to the on-chip system 722.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk, High Definition DVD ("HD-DVD") and Blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of presenting a contextual action on a wireless device, the method comprising:
   receiving a first content in a processor of the wireless device;
   deriving an indicator by interpreting the first content to identify a keyword of interest;
   processing, in the processor of the wireless device, the first content into a second content, the second content containing the indicator;
   associating the indicator with the contextual action, the contextual action identifying an action relating to the identified keyword of interest that may be executed by the processor upon selection of the indicator;
   presenting the second content on an electronic display of the wireless device such that the indicator indicates that user selection of the indicator will execute the contextual action associated with the selected indicator;
   selecting the indicator; and
   presenting the contextual action for the selected indicator on the electronic display of the wireless device by presenting a menu containing one or more alternative contextual actions for the selected indicator.

2. The method of claim 1, wherein presenting the second content in an electronic display of the wireless device such that the indicator indicates that user selection of the indicator will execute the contextual action associated with the selected indicator comprises:
   presenting the indicator contained by the second content with an altered appearance.

3. The method of claim 1, wherein the contextual action is preloaded on the wireless device.

4. The method of claim 1, wherein the contextual action is updatable from a maintainer server.

5. The method of claim 1, wherein associating the indicator with the contextual action further comprises:
   determining the association between the indicator and the contextual action using a database.

6. The method of claim 5, wherein the database is updatable from a maintainer server.

7. The method of claim 1, wherein presenting the contextual action for the selected indicator presents a third content, wherein the third content is different from the first content and the second content.

8. The method of claim 1, further comprising:
   selecting the contextual action; and
   providing input to a native application on the wireless device based on the contextual action.

9. The method of claim 8, wherein the input to the native application is provided via a plug-in, wherein the plug-in is updatable from a maintainer server.

10. A system for presenting a contextual action on an electronic display of the wireless device of a wireless device, the system comprising:
    means for receiving a first content in the wireless device;
    means for deriving an indicator by interpreting the first content to identify a keyword of interest;
    means for processing the first content into a second content, the second content containing the indicator;
    means for associating the indicator with the contextual action, the contextual action identifying an action relating to the identified keyword of interest that may be executed by the processor upon selection of the indicator;
    means for presenting the second content on the electronic display of the wireless device such that the indicator indicates that user selection of the indicator will execute the contextual action associated with the selected indicator;
    means for selecting the indicator; and
    means for presenting the contextual action for the selected indicator on the electronic display of the wireless device comprising means for presenting a menu containing one or more alternative contextual actions for the selected indicator.

11. The system of claim 10, wherein means for presenting the second content in an electronic display of the wireless device such that the indicator indicates that user selection of the indicator will execute the contextual action associated with the selected indicator comprises means for presenting the indicator with an altered appearance.

12. The system of claim 10, further comprising means for preloading the contextual action on a wireless device.

13. The system of claim 10, further comprising means for updating the contextual action from a maintainer server.

14. The system of claim 10, wherein the means for associating the indicator with the contextual action further comprises:
means for determining the association between the indicator and the contextual action using a database.

15. The system of claim 14, further comprising means for updating the database from a maintainer server.

16. The system of claim 10, wherein the means for presenting on the electronic display of the wireless device the contextual action for the selected indicator presents a third content, wherein the third content is different from the first content and the second content.

17. The system of claim 10, further comprising:
means for selecting the contextual action; and
means for providing input to a native application on the wireless device based on the contextual action.

18. The system of claim 17, wherein the means for providing input to the native application comprises means for providing input to the native application via a plug-in, wherein the plug-in may be updated by a maintainer server.

19. A non-transitory storage medium having stored thereon processor-executable instructions configured to cause a processor of a wireless device to perform operations comprising:
receiving a first content in the processor of the wireless device;
deriving an indicator by interpreting the first content to identify a keyword of interest;
processing the first content into a second content, the second content containing the indicator;
associating the indicator with the contextual action, the contextual action identifying an action relating to the identified keyword of interest that may be executed by the processor upon selection of the indicator;
presenting the second content on an electronic display of the wireless device such that the indicator indicates that user selection of the indicator will execute the contextual action associated with the selected indicator;
selecting the indicator; and
presenting the contextual action for the selected indicator on the electronic display of the wireless device by presenting a menu containing one or more alternative contextual actions for the selected indicator.

20. The non-transitory storage medium of claim 19, wherein the stored processor-executable software instructions are configured to cause the processor to perform further operations comprising:
presenting the indicator with an altered appearance.

21. The non-transitory storage medium of claim 19, wherein the stored processor-executable software instructions are configured to cause the processor to perform further operations comprising:
preloading the contextual action on the wireless device.

22. The non-transitory storage medium of claim 19, wherein the stored processor-executable software instructions are configured to cause the processor to perform further operations comprising:
updating the contextual action from a maintainer server.

23. The non-transitory storage medium of claim 19, wherein the stored processor-executable software instructions are configured such that associating the indicator with the contextual action further comprises:
determining the association between the indicator and the contextual action using a database.

24. The non-transitory storage medium of claim 23, wherein the stored processor-executable software instructions are configured such that the database is updatable from a maintainer server.

25. The non-transitory storage medium of claim 19, wherein the stored processor-executable software instructions are configured such that presenting the contextual action for the selected indicator presents a third content that is different from the first content and the second content.

26. The non-transitory storage medium of claim 19, the stored processor-executable software instructions are configured to cause the processor to perform operations further comprising:
selecting the contextual action; and
providing input to a native application on the wireless device based on the contextual action.

27. The non-transitory storage medium of claim 26, wherein the stored processor-executable software instructions are configured such that providing input to the native application comprises:
providing input to the native application via a plug-in that is updatable by a maintainer server.

28. A wireless device, comprising:
a transceiver configured to receive a first content;
a user interface;
a memory; and
a processor coupled to the transceiver, the user interface, and the memory, and configured to:
receive the first content;
derive an indicator by interpreting the first content to identify a keyword of interest;
process the first content into a second content, the second content containing the indicator;
associate the indicator with the contextual action, the contextual action identifying an action relating to the identified keyword of interest that may be executed by the processor upon selection of the indicator;
present the second content on an electronic display of the wireless device such that the indicator indicates that user selection of the indicator will execute the contextual action associated with the selected indicator;
select the indicator with the user interface; and
present via the user interface the contextual action for the selected indicator by presenting a menu containing one or more alternative contextual actions for the selected indicator.

29. The wireless device of claim 28, wherein the indicator is presented on the electronic display of the wireless device via the user interface and with an altered appearance with respect to the second content.

30. The wireless device of claim 28, wherein the contextual action is preloaded on the memory.

31. The wireless device of claim 28, wherein the contextual action is updatable from a maintainer server.

32. The wireless device of claim 28, wherein the processor is further configured to:
determine the association between the indicator and the contextual action using a database stored in the memory.

33. The wireless device of claim 32, wherein the database is updatable from a maintainer server.

34. The wireless device of claim 28, the processor being further configured to:
select the contextual action; and
provide input to a native application on the wireless device based on the contextual action.

35. The wireless device of claim 34, wherein the input to the native application is provided via a plug-in, wherein the plug-in is updatable from a maintainer server.

* * * * *